J. GONSIOR, F. OPP & W. FRANK.
ARMORED WAR AUTOMOBILE.
APPLICATION FILED MAR. 23, 1916.
1,204,758.
Patented Nov. 14, 1916.
2 SHEETS—SHEET 2.
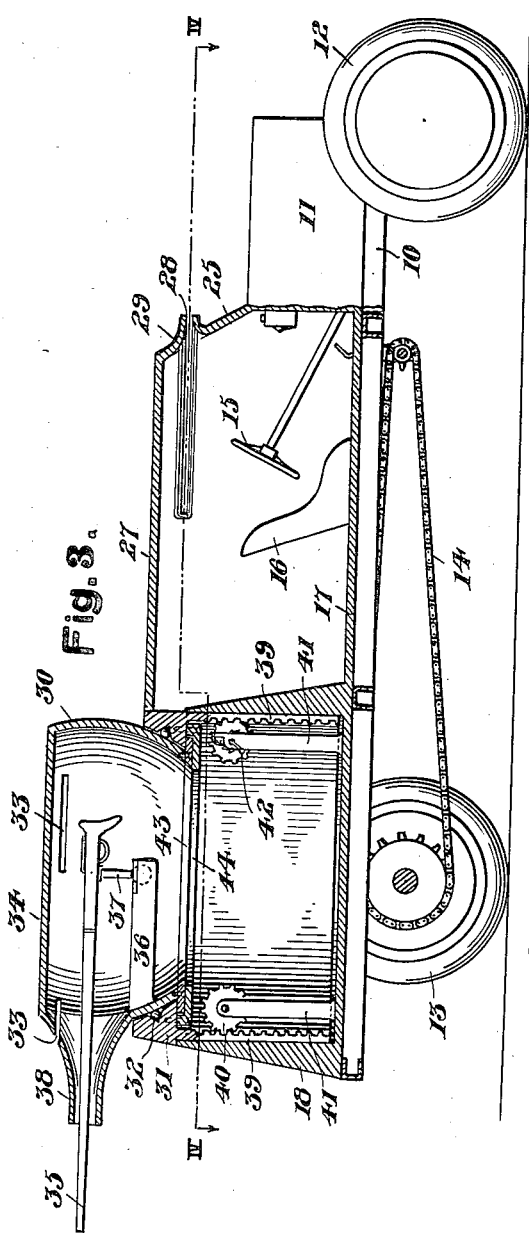
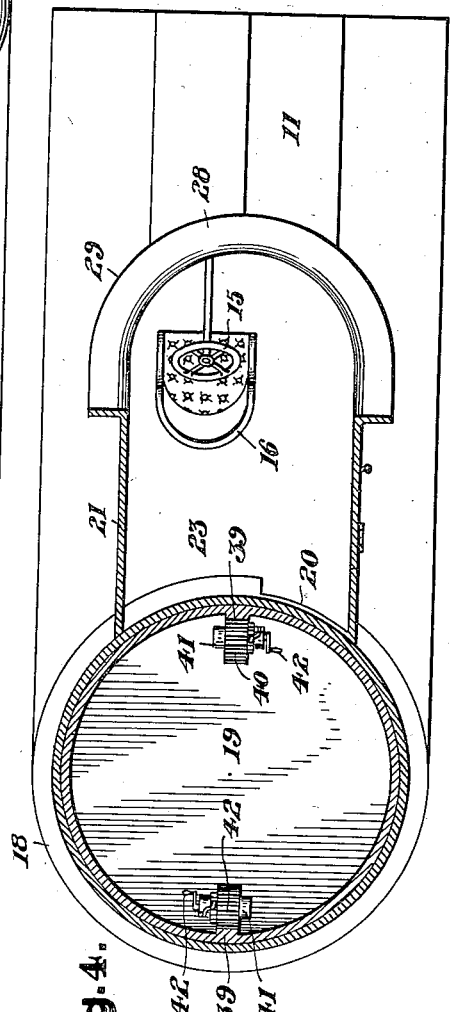
Inventors
J. Gonsior
F. Opp
W. Frank
By A. M. Wilson
Attorney

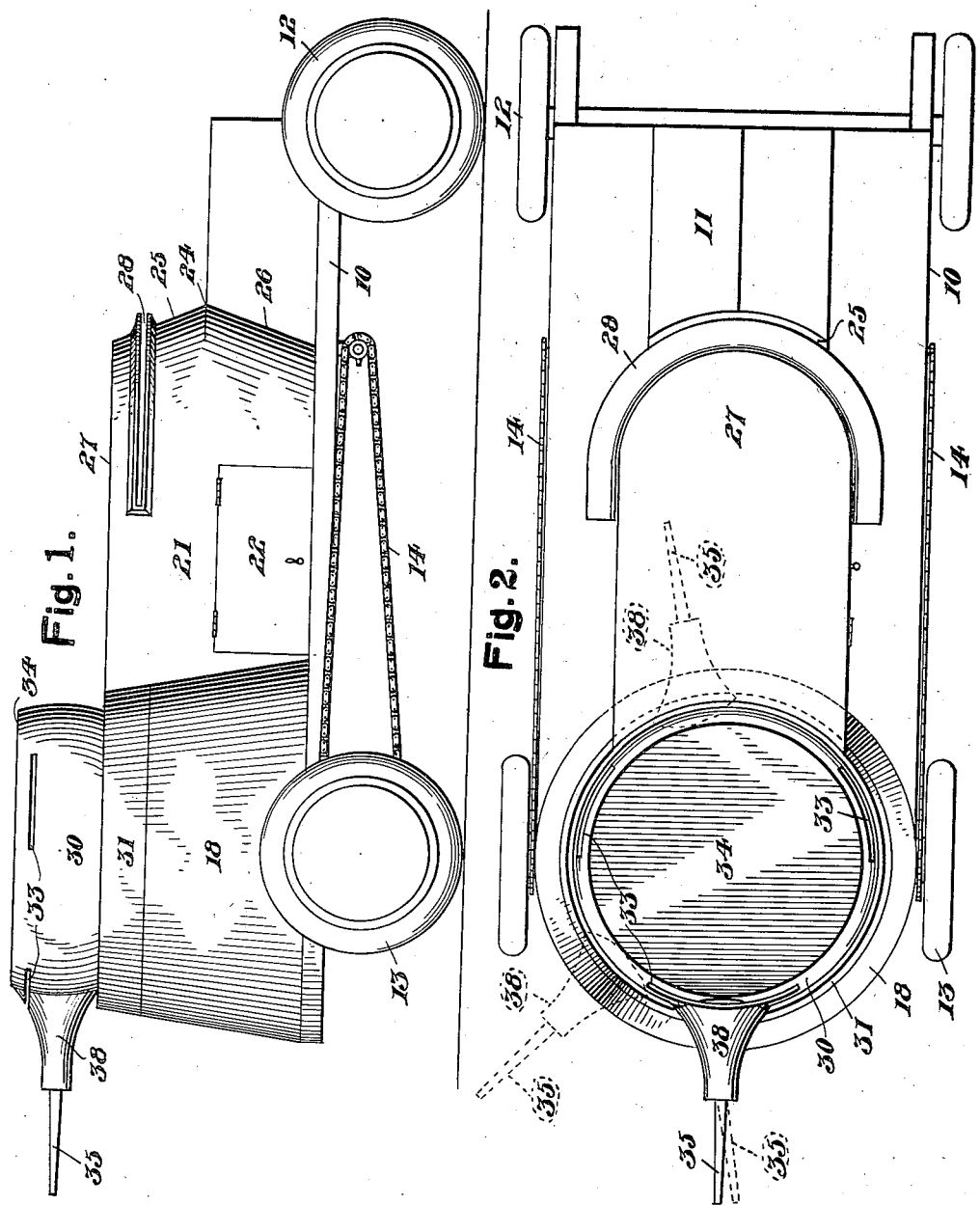

UNITED STATES PATENT OFFICE.

JOSEPH GONSIOR, FRIEDRICH OPP, AND WILLIAM FRANK, OF MEDINA, NORTH DAKOTA.

ARMORED WAR-AUTOMOBILE.

1,204,758.          Specification of Letters Patent.          Patented Nov. 14, 1916.

Application filed March 23, 1916. Serial No. 86,141.

*To all whom it may concern:*

Be it known that we, JOSEPH GONSIOR, FRIEDRICH OPP, and WILLIAM FRANK, subjects of the Emperor of Austria-Hungary, residing at Medina, in the county of Stutsman and State of North Dakota, have invented certain new and useful Improvements in Armored War-Automobiles, of which the following is a specification.

This invention relates to new and useful improvements in armored war automobile.

The primary object of the invention is to provide an armored automobile adapted for use in the time of war whereby the occupants thereof may travel in proximity to the enemy and operate rapid firing guns under cover of the armor which is provided.

A further object of the device is to provide an automobile with an inclosed body adapted to protect soldiers affording them an opportunity to shoot at the enemy without showing themselves, a gun turret being arranged capable of being elevated and lowered as well as moved rotarily.

A still further object is to provide an automobile of strong construction having inclosed bullet-proof walls whereby the operator as well as soldiers may be accommodated and protected therein, provision being made whereby missiles may be projected at the enemy in any desired direction and from different elevations.

With these general objects in view and others that will appear as the nature of the invention is better understood, the same consists in the novel combination and arrangement of parts hereinafter fully described, illustrated in the accompanying drawings and then claimed.

In the drawings forming a part of this application and in which like designating characters refer to corresponding parts throughout the several views: Figure 1 is a side elevation of the device. Fig. 2 is a top plan view thereof. Fig. 3 is a central vertical longitudinal sectional view through the device, with the forward portion in elevation, and Fig. 4 is a horizontal sectional view taken upon line IV—IV of Fig. 3.

The present device consists broadly of an armored gun carrying automobile having a frame 10, a hood 11, forward wheels 12 and rear wheels 13, the latter being driven by a chain drive 14 from the engine or motor (not shown), within the hood 11, while a steering wheel 15 of the usual construction is arranged adjacent the driver's seat 16 upon the horizontal platform 17 carried by the said frame 12.

An armored body is mounted upon the platform 17 consisting of a rearwardly arranged frusto-conical casing 18 having a circular compartment 19 therein adapted to receive soldiers entering through a door opening 20 from a forwardly arranged casing 21 oblong in form and connecting the casing 18 with the hood 11. The operator of the automobile is positioned within the forward casing 21 which is provided with an outside closable door 22, the said steering wheel and operator's seat being arranged within the forward casing 21, which latter is of sufficient size to accommodate a number of soldiers within the room 23 formed therein. The forward end 24 of the casing 21 is semi-circular in cross section, the upper and lower side portions 25 and 26 respectively tapering in opposite directions, while a roof or top 27 is arranged upon the said casing 21. A substantially semi-circular firing-port or slot 28 is provided in the front side portion 25 having wide oppositely arranged protecting flanges 29 for accommodating rifles therebetween operable by the soldiers from within the room 23. The port 28 is not only serviceable for firing purposes but also forms a window for the use of the driver of the automobile.

An inverted bowl-shaped turret 30 is mounted upon an annular base 31 by means of ball bearings 32 and adapted to be revolved as may be found desirable by the soldiers within the inclosure 19, slotted ports 33 being provided through the side of the said turret 30 which latter has a closed top 34. A rapid fire gun 35 is swivelly mounted upon a bracket 36 within the turret 30 by means of a swivelly mounted post 37, the gun being freely positioned through an outwardly tapering neck 38 carried by the said turret and of sufficient diameter to allow the gun 35 to be freely sighted and slightly tilted therethrough.

The turret base 31 is mounted upon the casing 18 and has oppositely arranged toothed racks 39 extending vertically within the said casing and meshing with gears 40 journaled in posts 41 which are operable by turn cranks 42 for elevating and lowering the turret 30 and base 31 at will. It will be noted that in the revoluble mounting of the turret 30 upon the said base 31, an outwardly projecting annular flange 43 is carried by the bottom of the turret which extends beneath the base 31 and seats upon a depending inwardly extending ring 44 carried by the lower face of the base 31, and whereby the turret is retained against removal from the said base in the case of accidents or under the impact of bullets and missiles upon the exterior of the said turret.

It will thus be evident that an armored automobile is provided which may be readily driven wherever desired, the occupants entering through the door 22 into the room 23 and thence through the doorway 20 into the closure 19, guns being readily fired in any desired direction through the port 33 of the turret while the gun 35 may be swung around for firing as found desirable and the port 28 may be employed for shooting forwardly of the machine.

While the form of the invention herein shown and described is what is believed to be the preferable embodiment thereof, it is nevertheless to be understood that minor changes may be made in the form, proportion and details of construction without departing from the spirit and scope of the invention as hereinafter claimed.

What we claim as new is:—

1. An army appliance comprising an automobile having a rearwardly arranged frusto-conical casing having an inclosure therein, a forward casing providing a room communicating with said inclosure and having a curved forward end, the upper and lower portions of which are inclined in opposite directions, the upper rearwardly inclined portion being provided with a substantially semi-circular slotted port having opposite protecting outwardly projecting flanges, and a closable entrance door for the said forward casing.

2. An army appliance comprising an automobile having a rearwardly arranged frusto-conical casing having an inclosure therein, a forward casing providing a room communicating with said inclosure and having a curved forward end, the upper and lower portions of which are inclined in opposite directions, the upper rearwardly inclined portion being provided with a substantially semi-circular slotted port having opposite protecting outwardly projecting flanges, an annular support positioned upon the said rear casing, elevating means for the said support within the said inclosure, an inverted bowl-shaped turret anti-frictionally journaled within the said support and provided with firing ports through the sides thereof.

3. A device of the class described comprising an automobile having a forwardly arranged driver's casing, a rearwardly positioned frusto-conical casing attached to the said forward casing, an annular turret support vertically adjustably mounted upon the said rear casing, an inverted bowl-shaped turret revolubly mounted within the said base, an annular outwardly projecting flange upon said turret positioned beneath said base, an inwardly extending ring carried by the said base beneath the said flange, a closure top upon said turret, an outwardly tapering gun receiving neck projecting from the said turret, a swivelly mounted gun within the said turret projecting through the said neck, the said turret and neck having arcuate slotted firing ports therethrough.

In testimony whereof we affix our signatures.

JOSEPH GONSIOR
FRIEDRICH OPP.
WILLIAM FRANK.